Aug. 20, 1929. M. P. HOLMES 1,725,081
TRANSPORT TRUCK
Filed Dec. 28, 1927 2 Sheets-Sheet 1

Inventor:
Morris P. Holmes.
by Luis A. Maxom
Attorney.

Aug. 20, 1929.  M. P. HOLMES  1,725,081
TRANSPORT TRUCK
Filed Dec. 28, 1927   2 Sheets-Sheet 2

Inventor:
Morris P. Holmes
by
Louis A. Maxom.
Attorney.

Patented Aug. 20, 1929.

1,725,081

UNITED STATES PATENT OFFICE.

MORRIS P. HOLMES, OF CLAREMONT, NEW HAMPSHIRE, ASSIGNOR TO SULLIVAN MACHINERY COMPANY, A CORPORATION OF MASSACHUSETTS.

TRANSPORT TRUCK.

Application filed December 28, 1927. Serial No. 243,046.

This invention relates to transport trucks, and more particularly, but not exclusively, to wheeled transport trucks for coal mining machines.

An object of this invention is to provide an improved wheeled transport truck. A further object is to provide an improved transport truck for a mining machine whereby the truck may be propelled by the power of the mining machine supported thereon. A still further object is to provide a transport truck for a unitary mining machine having improved driving connections between the mining machine and the truck wheels. Another object is to provide a transport truck for a unitary mining machine having improved means for maintaining the machine in operative position on the truck during propulsion of the truck by the machine thereon. These and other objects and advantages of this invention will, however, hereinafter more fully appear.

In the accompanying drawings there is shown for purposes of illustration one form which the invention may assume in practice.

In these drawings:—

Figure 1:
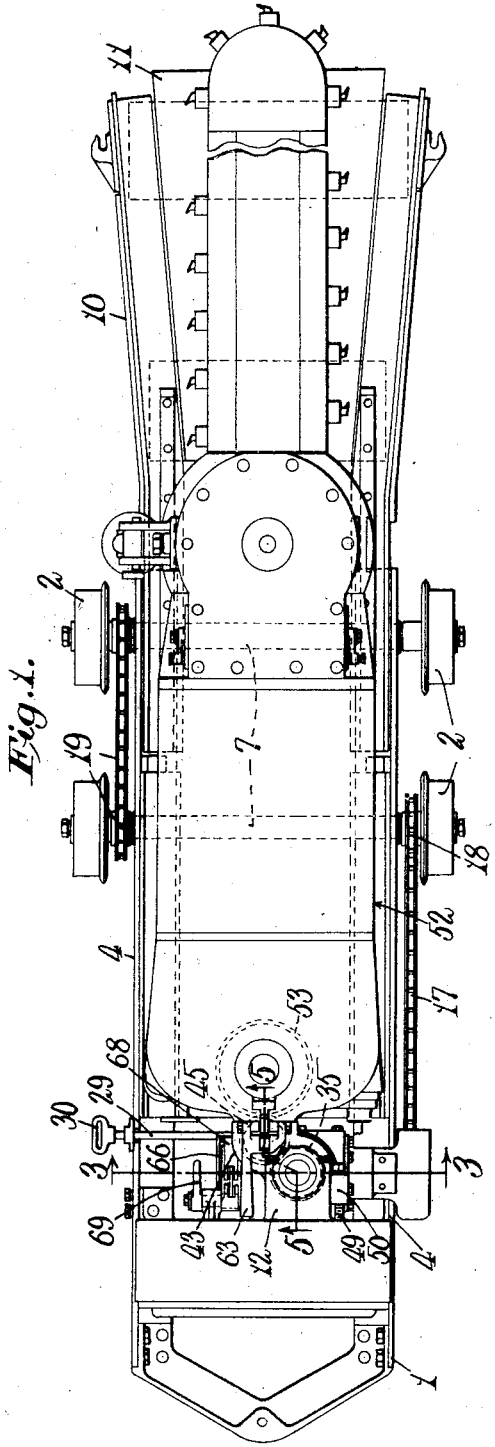
Fig. 1 is a plan view of the improved transport truck, a mining machine being shown in transport position thereon.
Figure 2:
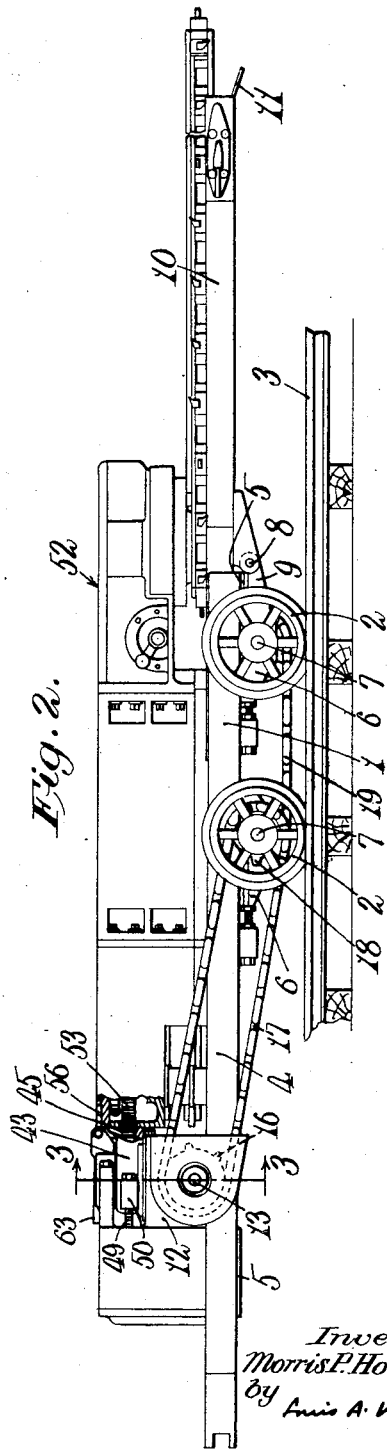
Fig. 2 is a side elevational view of the truck and machine shown in Fig. 1, the machine being shown partially in section to illustrate details of construction.

In this illustrative embodiment of the invention there is shown a transport truck of improved construction comprising a rigid truck frame 1 mounted on truck wheels 2 adapted to run along a trackway 3. The truck frame 1 consists of parallel frame members 4 held in rigid spaced relation by transverse plates 5 and these frame members carry usual axle boxes 6 within which the truck wheel axles 7 are journaled. Pivotally connected at 8 to a forwardly projecting portion 9 on each of the front axle boxes 6 is a usual tiltable machine receiving and guiding frame 10 having a portion overlying the frame members 4 and provided at its forward end with a ground engaging shoe or plate 11.

Figure 3:
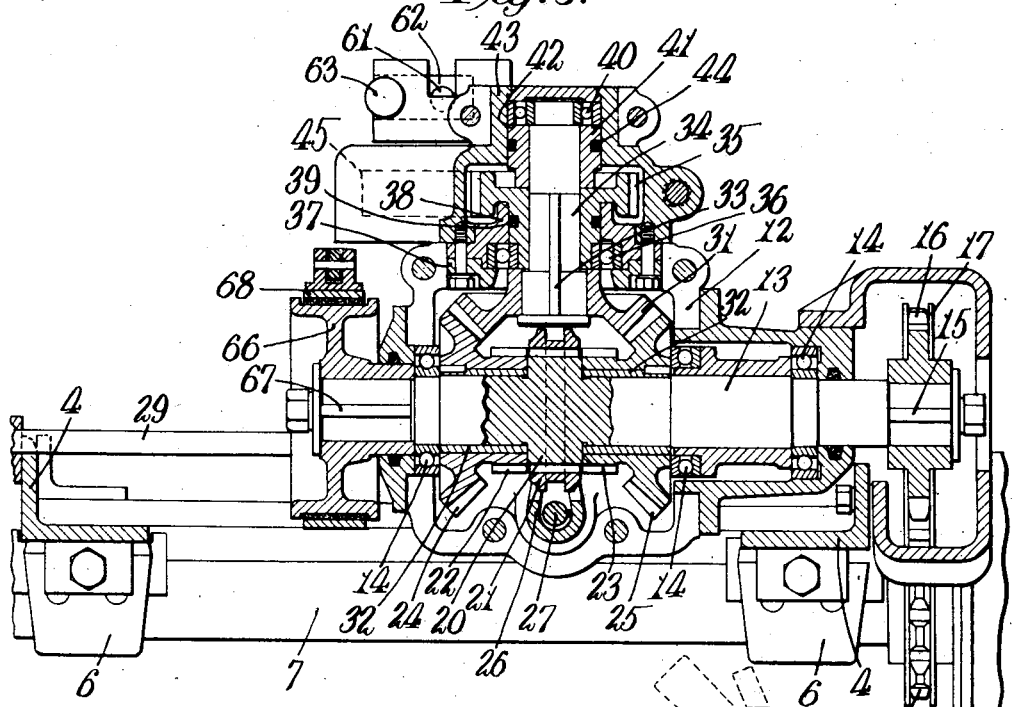
Fig. 3 is a vertical transverse sectional view taken on line 3—3 of Figs. 1 and 2.
Figure 5:
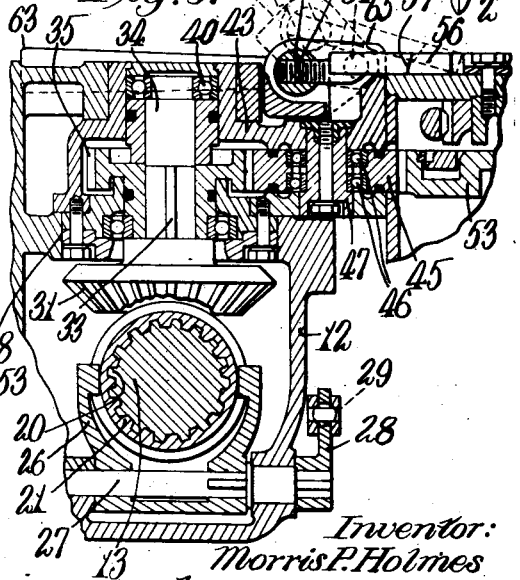
Fig. 5 is a vertical sectional view taken substantially on line 5—5 of Fig. 1.

In the improved construction there is shown supported on the rearward end of the truck frame 1 a casing 12 secured to the frame members 4 and housing truck driving connections including a transversely extending horizontal shaft 13 (see Fig. 3), journaled in ball bearings 14 suitably supported within the casing 12. This shaft 13 has secured thereto at 15 a truck driving sprocket 16 operatively connected through a chain connection 17 with a sprocket 18 fixed to the rear axle 7. As shown in Fig. 1 the rear and front axles 7 are connected in driving relation by a chain and sprocket connection 19. Again referring to Fig. 3 it will be observed that the shaft 13 has preferably formed integral therewith intermediate its ends a toothed clutch member 20 having connected thereto a shiftable internally toothed clutch member 21 alternatively connectible to toothed clutch members 22 and 23 formed on reverse bevel gears 24 and 25 respectively. Cooperating with the clutch member 21 is a shipper yoke 26 suitably fixed to a horizontal shaft 27 rotatably mounted within the casing 12. Suitably secured to the other end of the shaft at the front of the casing 12 is a lever arm 28. This lever arm is operatively connected to a slidable operating rod 29 arranged transversely of the track and having fixed thereto at its outer end an operating handle 30 conveniently located at the side of the truck frame. As illustrated the reverse bevel gears 24, 25 are each fixed to a bearing sleeve 32 journaled on the shaft 13 at each side of the clutch member 20. From the foregoing it is evident that when the clutch member 21 is shifted axially relatively to the shaft 13 to connect either the clutch member 22 or the clutch member 23 to the clutch member 20, one or the other of the reverse bevels 24, 25 is connected to the shaft 13 and as a result this shaft may be rotated in one direction or the other. Meshing with the reverse bevels 24, 25 is a bevel gear 31 keyed at 33 to a vertical shaft 34 disposed perpendicularly to the shaft 13 and above the latter. Also keyed to the shaft 34 is a spur gear 35 having a hub portion rotatably mounted in a ball bearing 36, suitably supported in a swingable bracket to be later described carried by the bearing 36 and held in position by a suitable retaining ring 37 secured to the bracket. Encircling the hub of the spur gear 35 is a cylindrical portion 38 formed on a part of the gear casing 12 and interposed between this cylindrical portion and the hub of the gear is a suitable packing ring 39 which forms a substantially leak-proof joint between the relatively movable parts. As shown in Fig. 3 the upper end of the shaft 34 is journaled in a ball bearing 40, while surrounding the upper end of this shaft is a sleeve 41 substantially fitting a bore 42 formed within the swingable bracket heretofore referred to and which is herein designated by the reference character 43. Carried by the sleeve 41 and engaging the walls of the bore 42 is a packing ring 44 similar to the packing ring 39. Meshing with the spur gear 35 is a spur gear 45 (see Fig. 5), suitably journaled on ball bearings 46 supported on a vertical shaft 47. As illustrated the shaft 47 is suitably secured within the swingable bracket 43. This bracket 43, to which the retaining ring 37 heretofore referred to is secured, is mounted for horizontal swinging movement within alined vertical bores 48 formed within the gear casing 12, this bracket together with the gear 45 being adapted to swing about the axis of the gear 35. Swinging movement of the gear 45 in one direction is limited by an adjustable set screw 49 threadedly connected within a laterally projecting boss 50 formed on the side of the bracket. This set screw 49 is adapted to abut against the vertical plane surface 51 on the gear casing 12.

Figure 4:
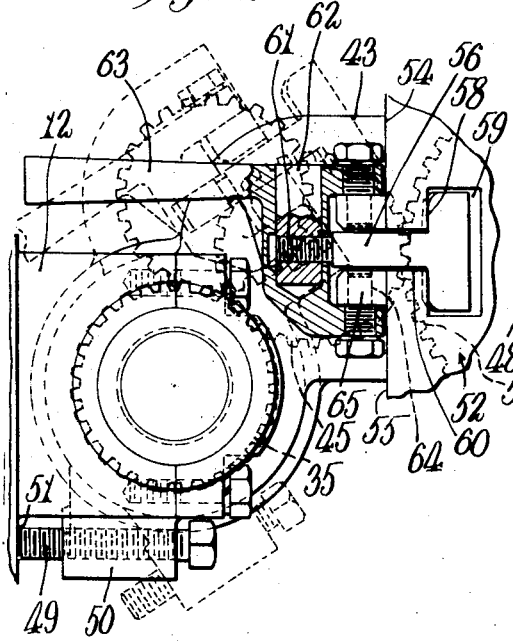
Fig. 4 is a fragmentary plan view, partially in section, illustrating a portion of the improved truck driving connections.

In accordance with this illustrative embodiment of the invention there is shown mounted on the improved transport truck a unitary mining machine generally designated 52 which is of the flexibly fed room and pillar type generally similar to that described in my copending application Ser. No. 179,357, filed Mar. 29, 1927. The machine 52 is of the type which slides on its bottom on the mine floor during its operation and is provided with a feeding mechanism, as clearly described in my copending application mentioned above, including a spur gear 53 which is adapted to mesh with and drive the spur gear 45 (see Fig. 5). The swingable bracket 43 is provided with a vertical plane abutment surface 54 engageable with a corresponding plane abutment surface 55 formed on the mining machine 52. Improved means are provided for maintaining the plane surfaces 54, 55 on the bracket 43 and mining machine respectively, in abutting engagement in such a manner as to maintain the gears 45 and 53 in mesh during propulsion of the truck by the power of the mining machine. This means specifically comprises a T-shaped latch 56 having an inclined or beveled surface 57 adapted to underlie a similar undercut or beveled surface 58 formed on one side of a T-shaped recess 59 formed within the frame of the mining machine 52. As shown in Fig. 4 the frame of the mining machine is slotted as at 60 to permit the T-shaped head of the latch 56 to swing freely downwardly within the recess 59. The latch 56 is threadedly connected at 61 to a pin 62 rotatably carried by an operating lever 63. This lever 63 is pivotally mounted at 64 on pins carried by the lever and engaging bores formed within upstanding lugs 65 herein preferably cast integral with the bracket 43. From the foregoing description it is evident that when the latch 56 is swung from the left hand dotted line position shown in Fig. 5 to the other dotted line position and when the lever 63 is swung downwardly the beveled surface on the latch engages the inclined surface 57 on the machine frame and the plane surfaces on the bracket and machine frame are clamped into abutting engagement. As a result the gears 45 and 53 are brought into operative meshing engagement. Mechanism is provided for braking rotation of the truck wheels, for instance when the truck is moving along an inclined trackway, this braking mechanism comprising a brake drum 66 keyed at 67 to the end of the shaft 13 opposite from the truck driving sprocket 16. Cooperating with the periphery of this brake drum is a contractible brake band 68 having suitable operating means including a pivoted operating lever 69 conveniently located adjacent the handle 30, (see Fig. 1).

In the use of the improved transport truck, after the mining machine has been moved over the tiltable guide frame 10 onto the truck frame under the propulsion of its feeding mechanism in a well-known manner, the machine assumes a position similar to that shown in Fig. 1. The operator then swings the bracket 43 together with the gear 45 from the dotted line position shown in Fig. 4 to the full line position, the set screw 49 abutting the plane surface 51 on the gear casing and thereby preventing further swinging movement of the bracket. The operator then swings the latch 56 into the recess 59 in the machine frame and thereafter swings the lever 63 downwardly, rigidly clamping the bracket 43 to the machine frame and as a result the gears 45 and 53 are brought into operative meshing engagement, the pivotal axis of the latch being disposed below a horizontal plane including the pivotal axis of the lever at that time thereby locking the parts against inadvertent release. When it is desired to propel the truck forwardly along the trackway the operator grasps the handle 30 and shifts the clutch member 21 axially into engagement with the clutch member 22 thereby clutching the bevel gear 24 to the shaft 13. The wheels of the transport truck may then be driven by power from the mining machine 52 through the gearings 53, 45, 35, 31, 24 and the chain and sprocket connections 17 and 19. When it is desired to propel the truck rearwardly the operator shifts the clutch member 21 in the opposite direction thereby disconnecting the clutch members 22, 20 and connecting the clutch member 20 to the clutch member 23 thereby connecting the bevel gear 25 to the shaft 13. When it is desired to brake rotation of the truck wheels, the clutch member 21 is thrown into its intermediate or neutral position and the brake band 68 applied thereby preventing rotation of the shaft 13 which is operatively connected to the truck wheels. During the unloading operation of the machine the operator swings the lever 63 from the full line position shown in Fig. 5 to the dotted line position, thereby releasing the beveled surface 57 on the latch from the corresponding surface on the machine frame and moving the latch to the right hand dotted line position. The operator then swings the latch 56 upwardly about its pivot to the left hand dotted line position shown in Fig. 5, thereby disconnecting the bracket 43 from the machine frame. The bracket 43 together with the gear 45 may then be swung laterally about its pivot from the full line position shown in Fig. 4 to the dotted line position. The mining machine may then be moved under the propulsion of its feeding mechanism from the transport truck in a well-known manner.

As a result of this invention it will be noted that an improved mining machine transport truck is provided having improved driving connections between the mining machine and the truck wheels whereby accurate alinement of the gearing on the truck and the machine is unnecessary, the initial driving gear on the truck being swung into driving engagement with the driving gear on the machine and rigidly clamped in position. It will further be noted that an improved transport truck is provided wherein the driving connections between the mining machine and truck wheels are extremely simple, rugged and compact and are well adapted to withstand the severe service conditions encountered in a mine.

While I have in this application specifically described one form which my invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a transport truck adapted to support a unitary mining machine, a truck frame having machine receiving means, and truck propelling means comprising a driving element mounted on the truck frame for swinging movement and swingable into operative engagement with a driving element on the mining machine.

2. In a transport truck adapted to support a unitary mining machine, a truck frame having machine receiving means, and truck propelling means comprising a driving element rotatable about its own axis and pivotally supported on the truck frame so that its axis may be moved about said pivot to bring said driving element directly into operative engagement with a driving element on the mining machine.

3. In a transport truck adapted to support a unitary mining machine, a truck frame having machine receiving means, and truck propelling means comprising a driving element mounted on the truck frame for swinging movement and swingable into operative engagement with a driving element on the mining machine, and means for maintaining said elements in operative engagement.

4. In a transport truck adapted to support a unitary mining machine, a truck frame having machine receiving means, and truck propelling means comprising a driving gear mounted for horizontal swinging movement about a pivot offset from its own axis and engageable in meshing relation with a non-coaxial driving gear on the mining machine.

5. In a transport truck adapted to support a unitary mining machine, a truck frame having machine receiving means, and truck propelling means comprising a driving gear mounted for horizontal swinging movement about a pivot offset from its own axis and engageable in meshing relation with a non-coaxial driving gear on the mining machine, and means for maintaining said gears in meshing engagement.

6. In a transport truck adapted to support a unitary mining machine, a truck frame having machine receiving means, and truck propelling means comprising a transmission gear, a bracket pivotally mounted upon an axis coaxial with said gear, and a second gear carried by said bracket and meshing with said first gear, said second gear being swingable into meshing engagement with a driving gear on the mining machine.

7. In a transport truck adapted to support a unitary mining machine, a truck frame having machine receiving means, and truck propelling means comprising a transmission gear, a bracket pivotally mounted upon an axis coaxial with said gear, a second gear carried by said bracket and meshing with said first gear, said second gear being swingable into meshing engagement with a driving gear on the mining machine, and means on the truck engageable with the mining machine for maintaining said second gear and said third mentioned gear in meshing engagement.

8. In a transport truck adapted to support a unitary mining machine, a truck frame having machine receiving means, and truck propelling means comprising a transmission gear, a bracket pivotally mounted upon an axis coaxial with said gear, a second gear carried by said bracket and meshing with said gear, said second gear being swingable into meshing engagement with a driving gear on the mining machine, and means carried on the truck frame and engaging the mining machine for clamping said bracket to the machine for maintaining said second gear and said last mentioned gear in meshing engagement.

9. In a transport truck adapted to support a unitary mining machine including a frame having a T-shaped recess therein, a truck frame having machine receiving means, and means for maintaining the machine in position on said truck frame including a latch pivoted on the truck frame and having a T-shaped head swingable into engagement with the T-shaped recess on the mining machine, and means for moving said latch into operative locking engagement with the machine.

10. In a transport truck adapted to support a unitary mining machine including a frame having a T-shaped recess therein, a truck frame having machine receiving means, and means for maintaining the machine in position on said truck frame including a latch pivoted on the truck frame and having a T-shaped head swingable into engagement with the T-shaped recess on the mining machine, and means for moving said latch into operative locking engagement with the machine including a pivoted lever operatively connected to said latch.

11. In a transport truck adapted to support a unitary mining machine, a truck frame having machine receiving means, and truck propelling means comprising a transmission gear rotatable about a vertical axis, a bracket mounted for swinging movement about the axis of said gear, a second gear journaled on said bracket and meshing with said first gear, said second gear being swingable into meshing engagement with a driving gear on the mining machine, and means including a latch pivotally mounted on said bracket engageable with the machine for maintaining said second gear and said third mentioned gear in meshing engagement.

12. In a transport truck adapted to support a unitary mining machine, a truck frame having machine receiving means, and truck propelling means comprising a transmission gear rotatable about a vertical axis, a bracket mounted for swinging movement about the axis of said gear, a second gear journaled on said bracket and meshing with said first gear, said second gear being swingable into meshing engagement with a driving gear on the mining machine, means including a latch pivotally mounted on said bracket and engageable with the machine for maintaining said second gear and said third mentioned gear in meshing engagement, and a lever pivotally mounted on said bracket for moving said latch into locking engagement with the machine.

13. In a transport truck adapted to support a unitary mining machine, a truck frame having machine receiving means, means for locking the machine in transport position on said receiving means, and truck propelling means comprising a driving element on the truck horizontally swingable into driving engagement with a driving element on the machine.

14. In a transport truck adapted to support a unitary mining machine, a truck frame having machine receiving means, means for locking the machine in transport position on said receiving means, and truck propelling means comprising a driving element on the truck horizontally swingable into driving engagement with a driving element on the machine, said locking means also constituting means for maintaining said driving elements in operative engagement.

In testimony whereof I affix my signature.

MORRIS P. HOLMES.